No Printed Specification Available
8726X
E. Whitman,
Cradle.
Patented Mar. 27, 1835.
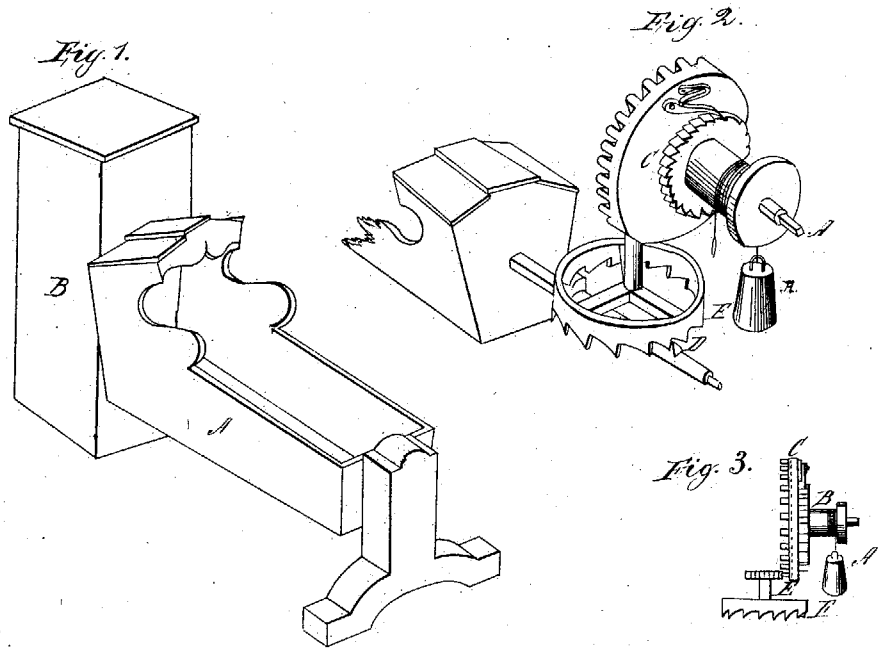
N. PETERS, PHOTO-LITHOGRAPHER, WASHINGTON, D. C.

3 Av. 12

8726X Mar. 27. 1835 463.

Ezra Whitman Junr.

for a Machine to propel Cradles and churns.

The schedule referred to in these Letters Patent and making part of the same, containing a description in the words of the said Ezra Whitman Junr. himself of his improvement in a machine to propel cradles and churns —

To all, to whom these Presents shall come

Be it known, that I. Ezra Whitman Jr. of Winthrop the county of Kennebec and State of Maine, have invented a new and useful improvement in a Machine to propel Churns and also Cradles, and that the following is a full and exact description of the construction and operation of the said Machine as improved & invented by me.-

Fig. 1. (See the accompanying plate) represents the cradle as prepared for use- A the cradle or churn- B the case enclosing the clockwork which swings them. When a cradle is to be attached to the Clockwork, I make it in the usual form and attach one end firmly to the rod or verge which plays into the escapement.- In the other end I put a pivot which plays into a socket; the weight is then wound up & the cradle or churn is made to swing back and forth as it descends.

For a churn I make an oblong or other shaped box and attach it in like manner to the clock work, & it is made to swing or tilt and thus agitate the cream until the butter shall come -

Fig. 2. Exhibits the combination of clock or wheelwork, by which I effect or produce the desired motions. A- the weight. B.. the ratchet wheel- C a large spur a bevel wheel which plays into the cogs of a pinion on the shaft C.... H- is the escapement or toothed wheel upon the same shaft. D. the verge to which the cradle or churn is attached

8726X

Fig.e 3. is a linear view of the same combination of wheel or clock work

Claims – What I specifically claim, as my improvement and for which I request an exclusive right, is the application of the machinery as above described In testimony, that the above is a true specification of my said improvement as above described, I have hereunto set my hand this fifth day of March in the year of our Lord 1835 –

Witnesses.
Ezekiel Holmes }
Seth May

Ezra Whitman Jr.

Ex.d M.G.C.

Patented March 27. 1835 (456 words)

(Drawing.)